US012755285B2

(12) United States Patent
Agrawal et al.

(10) Patent No.: US 12,755,285 B2
(45) Date of Patent: Oct. 6, 2026

(54) LOCATION BASED TRANSACTION AUTHENTICATION

(71) Applicant: Motorola Mobility LLC, Chicago, IL (US)

(72) Inventors: Amit Kumar Agrawal, Bangalore (IN); Vijayprakash Idlur, Bangalore (IN); Panduranga Reddy Pailla, Bangalore (IN)

(73) Assignee: Motorola Mobility LLC, Chicago, IL (US)

( * ) Notice: Subject to any disclaimer, the term of this patent is extended or adjusted under 35 U.S.C. 154(b) by 22 days.

(21) Appl. No.: 18/491,069

(22) Filed: Oct. 20, 2023

(65) Prior Publication Data

US 2025/0131434 A1 Apr. 24, 2025

(51) Int. Cl.
*G06Q 20/40* (2012.01)
*G06Q 20/38* (2012.01)

(52) U.S. Cl.
CPC ....... *G06Q 20/4015* (2020.05); *G06Q 20/386* (2020.05); *G06Q 20/4014* (2013.01)

(58) Field of Classification Search
None
See application file for complete search history.

(56) References Cited

U.S. PATENT DOCUMENTS

2014/0149294 A1* 5/2014 Leevendig ............. G06Q 20/12 705/71
2014/0250009 A1* 9/2014 Carlson .............. G06Q 20/3226 705/44
2021/0065165 A1* 3/2021 Wadhwa .............. G06Q 20/027
2021/0152540 A1* 5/2021 Kumar Agrawal .......................... H04W 12/069
2021/0367954 A1* 11/2021 Daga ................... H04L 63/0838

OTHER PUBLICATIONS

Farid Binbeshr et al., Secure PIN-Entry Method Using One-Time Pin (OTP), Feb. 6, 2023 (Year: 2023).*
"Wire Trans•fer Scams", Attorney General of Texas [online]]retrieved Oct. 13, 2023]. Retrieved from the Internet <https://www.texasattorneygeneral.gov/consumer-protection/financial-and-insurance-scams/wire-transfer-scams>, 2 pages.
Google LLC , "How we fought Search spam on Google in 2020", Google Search Central Blog, Google LLC [retrieved Oct. 13, 2023]. Retrieved from the Internet <https://developers.google.com/search/blog/2021/04/how-we-fought-search-spam-2020>, Apr. 29, 2021, 6 pages.

* cited by examiner

*Primary Examiner* — Patrick Mcatee
*Assistant Examiner* — Timothy Paul Sax
(74) *Attorney, Agent, or Firm* — FIG. 1 Patents

(57) ABSTRACT

In aspects of location based transaction authentication, a mobile device includes a location service to determine a device location of the mobile device. The mobile device also implements a transaction authentication manager that can receive a transaction location of a transaction associated with an account of a user of the mobile device, and compare the device location of the mobile device to the transaction location of the transaction. The transaction authentication manager can also receive a one time password that is masked in response to determining that the device location does not match the transaction location, and reveal the one time password in response to receiving an input on the mobile device to authenticate the transaction.

20 Claims, 7 Drawing Sheets

LOCATION BASED TRANSACTION AUTHENTICATION

BACKGROUND

Devices such as smart devices, mobile devices (e.g., cellular phones, tablet devices, smartphones), consumer electronics, and the like can be implemented for use in a wide range of environments and for a variety of different applications. For example, many users of mobile devices utilize a consumer application in the form of mobile banking, digital banking, or any other type of application used to track and/or initiate transactions associated with user accounts. These consumer applications employ various methods to protect against fraudulent transactions charged to the associated user accounts. For example, consumer applications often utilize one time passwords as single-use passwords sent to a user of a mobile device via an email message and/or a standard text message. Generally, the message that includes the one time password often prompts the user of the mobile device to enter the one time password into a graphical user interface of the consumer application and/or a web site linked to the user account.

BRIEF DESCRIPTION OF THE DRAWINGS

Implementations of the techniques for location based transaction authentication are described with reference to the following Figures. The same numbers may be used throughout to reference like features and components shown in the Figures.

DETAILED DESCRIPTION

Figure 1:
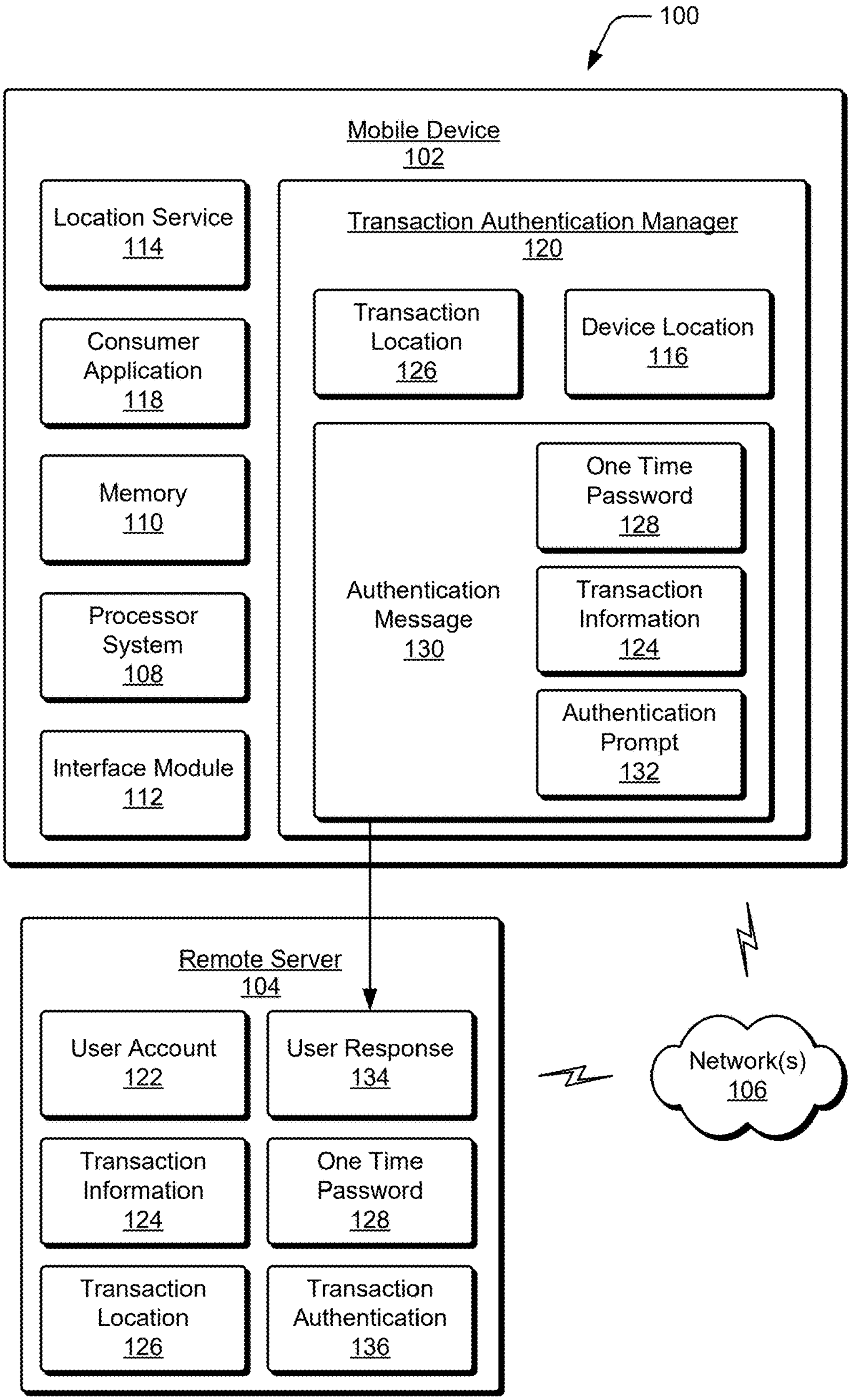
FIG. 1 illustrates an example system for location based transaction authentication in accordance with one or more implementations as described herein.

Implementations of the techniques for location based transaction authentication may be implemented as described herein. A mobile device, such as any type of a wireless device, media device, mobile phone, flip phone, client device, tablet, computing, communication, entertainment, gaming, media playback, and/or any other type of computing, consumer, and/or electronic device, or a system of any combination of such devices, may be configured to perform techniques for location based transaction authentication, as described herein. In one or more implementations, a mobile device includes a transaction authentication manager which can be used to implement aspects of the techniques described herein.

Conventional techniques for fraud prevention include multi-factor authentication, data encryption, data integrity maintenance during data transit and storage, and one time passwords. One time passwords are typically generated as a string of numbers, letters, symbols, and/or characters and communicated to a mobile device via an email message, a standard text message, a notification message from a device application, and/or any other type of notification. A one time password is typically a single-use password sent to a user associated with a user account that prompts the user to enter the one time password into a graphical user interface of the consumer application and/or a web site linked to the user account. Fraudsters have discovered ways of getting around these conventional techniques. For example, a fraudster can initiate a transaction from a remote location using stolen data from a user's financial account initiating a one time password to be sent to the user's mobile device. A fraudster can call the user's mobile device using the stolen data and impersonate a representative of the mobile financial service to ask for the one time password. Many users believe the fraudster and provide the one time password, and the fraudster can authenticate the fraudulent transaction. Thus, a solution for fraudulent theft of one time passwords is required.

To overcome these difficulties, and in aspects of the described techniques, a transaction authentication manager is implemented by a mobile device to compare a device location of the mobile device and a transaction location in order to provide a safe delivery of a one time password. The mobile device also implements a location service to determine the device location of the mobile device that describes the physical location in which the mobile device is situated. The transaction authentication manager can also receive the transaction location of a transaction that is associated with an account of a user of the mobile device. The user account may be any type of financial account linked to the user's mobile device that manages, tracks, and/or initiates transactions, such as a consumer account, mobile banking account, and/or a digital banking account. The transaction location may be received from a remote server that may be any type of bank server, consumer server, and/or network server that collects, stores, and/or communicates transaction information associated with user accounts.

The transaction authentication manager can compare the transaction location associated with the account of the user and the device location of the mobile device. In this manner, the transaction authentication manager can alert the user to a potentially fraudulent transaction if the transaction was initiated from a location that is different from the location of the mobile device. For example, if the transaction authentication manager determines that the device location of the mobile device does not match the transaction location, then the transaction authentication manager can generate an authentication message with a one time password that is masked to be concealed from the user of the mobile device. The masked one time password can be the one time password with all the characters, numbers, letters, and/or symbols replaced with a single repeating character, such as an asterisk. The authentication message can also include transaction information, such as the transaction location, a type of the transaction, a type of good purchased, the value of the transaction, and/or any other type of transaction information.

The authentication message can be received as an email message, a standard text message, a consumer application notification message, and/or any other message that can be displayed on the mobile device. The authentication message can be displayed on a display of the mobile device with an authentication prompt. The authentication prompt may prompt the user of the mobile device to authenticate the transaction that is associated with the user's account. If the transaction authentication manager receives input indicating that the user of the mobile device is authenticating the transaction, then the transaction authentication manager can reveal the one time password that is masked. For example, the transaction authentication manager can replace the repeating single character, such as the asterisks, with the original characters, numbers, letters, and/or symbols of the one time password. In this manner, the transaction authentication manager can reveal the one time password once the user of the mobile device has authenticated a potentially fraudulent transaction that was initiated from a remote location that is different from the location of the mobile device. The authentication message can then prompt the user to input the one time password into a graphical user interface of the mobile device, such as of the consumer application linked to the user's account, and/or a website linked to the user's account. If the transaction authentication manager receives input of the one time password, the transaction authentication manager can initiate an authentication of the transaction associated with the user's account by communicating a user response to the remote server.

In an alternative implementation, the transaction authentication manager can determine that the device location of the mobile device matches the location of the transaction. In this implementation, the transaction may have been initiated from the user account that is implemented on the mobile device. Thus the transaction authentication manager may determine that the transaction is less likely to be fraudulent. If the transaction authentication manager determines that the device location matches the transaction location, then the transaction authentication manager can initiate a display of the one time password without masking. The authentication message can prompt the user to input the one time password into a graphical user interface of the mobile device, such as of the consumer application linked to the user's account, and/or a website linked to the user's account. The authentication message may also include any of the transaction information, as described above. If the transaction authentication manager receives input of the one time password, the transaction authentication manager can initiate an authentication of the transaction associated with the user's account by communicating a user response to the remote server.

In implementations, the user of the mobile device may indicate, via user input, that the transaction associated with the user's account is fraudulent. In these implementations, the transaction authentication manager may generate a user response to be communicated to the remote server to flag the transaction as fraudulent. The user of the mobile device may indicate, via user input, that the transaction associated with the user's account is fraudulent by indicating on the authentication prompt, or by not entering the one time password when prompted. The transaction authentication manager can also maintain the masked one time password to conceal the one time password from the user of the mobile device. In this way, the user of the mobile device cannot be tricked into sharing the one time password with a fraudster because the user doesn't even know the password, which is concealed.

While features and concepts of the described techniques for location based transaction authentication is implemented in any number of different devices, systems, environments, and/or configurations, implementations of the techniques for location based transaction authentication are described in the context of the following example devices, systems, and methods.

FIG. 1 illustrates an example system 100 for location based transaction authentication, as described herein. The system 100 includes a mobile device 102, a remote server 104, and a communication network 106. Examples of mobile device include at least one of any type of a wireless device, mobile device, mobile phone, flip phone, client device, companion device, tablet, computing device, communication device, entertainment device, gaming device, media playback device, or any other type of computing, consumer, and/or electronic device. Examples of the remote server 104 can include any type of server device, cloud storage, network system, and/or any other device that can collect, store, and communicate data separate from the mobile device 102. For example, the remote server 104 can be a bank server, consumer server, and/or network system that collects, stores, and/or communicates transaction information associated with user accounts.

The mobile device 102 can implemented with various components, such as a processor system 108 and memory 110, as well as any number and combination of different components as further described with reference to the example device shown in FIG. 7. In implementations, the mobile device 102 includes various radios for wireless communication with other devices. For example, the mobile device 102 can include at least one of a BLUETOOTH® (BT) or BLUETOOTH® Low Energy (BLE) transceiver, a near field communication (NFC) transceiver, or the like. In some cases, the mobile device 102 includes at least one of a WI-FI® radio, a cellular radio, a global positioning satellite (GPS) radio, or any available type of device communication interface.

In some implementations, the devices, applications, modules, servers, and/or services described herein communicate via the communication network 106, such as for data communication between the mobile device 102 and the remote server 104. The communication network 106 includes a wired and/or a wireless network. The communication network 106 is implemented using any type of network topology and/or communication protocol, and is represented or otherwise implemented as a combination of two or more networks, to include IP-based networks, cellular networks, and/or the Internet. The communication network 106 includes mobile operator networks that are managed by a mobile network operator and/or other network operators, such as a communication service provider, mobile phone provider, and/or Internet service provider.

The mobile device 102 includes various functionality that enables the device to implement different aspects of location based transaction authentication, as described herein. In one or more examples, an interface module 112 represents functionality (e.g., logic and/or hardware) enabling the mobile device 102 to interconnect and interface with other devices and/or networks, such as the communication network 106. For example, the interface module 112 enables wireless and/or wired connectivity of the mobile device 102 and the remote server 104. The interface module 112 can include at least one of a WI-FI® radio, a cellular radio, a global positioning satellite (GPS) radio, or any available type of device communication interface to interconnect and interface with any devices and/or networks separate from the mobile device 102. The mobile device 102 can also be implemented with a location service 114 as a functionality (e.g., logic and/or hardware) enabling the mobile device to determine a device location 116 in which the mobile device is physically located. For example, the location service 114 can include at least one of a WI-FI® radio, a cellular radio, a global positioning satellite (GPS) radio, or any available type of device communication interface to determine the device location 116 of the mobile device 102.

The mobile device 102 can include and implement various device applications, such as any type of consumer application 118, messaging application, email application, video communication application, cellular communication application, music/audio application, gaming application, media application, social platform applications, and/or any other of the many possible types of various device applications. Many of the device applications have an associated application user interface that is generated and displayed for user interaction and viewing, such as on a display screen of the mobile device 102. Generally, an application user interface, or any other type of video, image, graphic, and the like is digital image content that is displayable on the display screen of the mobile device 102. Generally, the consumer application 118 may be any type of mobile banking application, digital banking application, and/or any other application that processes and/or tracks transactions linked to a user of the mobile device 102.

In the example system 100 for location based transaction authentication, the mobile device 102 implements a transaction authentication manager 120 (e.g., as a device application). As shown in this example, the transaction authentication manager 120 represents functionality (e.g., logic, software, and/or hardware) enabling aspects of the described techniques for location based transaction authentication. The transaction authentication manager 120 can be implemented as computer instructions stored on computer-readable storage media and can be executed by a processor system of the mobile device 102. Alternatively, or in addition, the transaction authentication manager 120 can be implemented at least partially in hardware of the device.

In one or more implementations, the transaction authentication manager 120 includes independent processing, memory, and/or logic components functioning as a computing and/or electronic device integrated with the mobile device 102. Alternatively, or in addition, the transaction authentication manager 120 can be implemented in software, in hardware, or as a combination of software and hardware components. In this example, the transaction authentication manager 120 is implemented as a software application or module, such as executable software instructions (e.g., computer-executable instructions) that are executable with a processor system of the mobile device 102 to implement the techniques and features described herein. As a software application or module, the transaction authentication manager 120 can be stored on computer-readable storage memory (e.g., memory of a device), or in any other suitable memory device or electronic data storage implemented with the controller. Alternatively or in addition, the transaction authentication manager 120 is implemented in firmware and/or at least partially in computer hardware. For example, at least part of the transaction authentication manager 120 is executable by a computer processor, and/or at least part of the content manager is implemented in logic circuitry.

In this example system 100, the remote server 104 receives a notification of a transaction that is associated with a user account 122. The user account 122 may be any type of account that is linked to transactions, such as a mobile banking account, a digital banking account, and/or a consumer account. In implementations, the user account 122 is associated with a user of the mobile device 102. For example, the user account 122 can be associated with a mobile phone number of the mobile device 102, an IP address of the mobile device, and/or any other mobile device identification information. The user account 122 may also be linked to the mobile device 102 through the consumer application 118, which can be a mobile banking application, digital banking application, and/or any other application that processes and/or tracks transactions linked to the user of the mobile device.

In implementations of location based transaction authentication, as described herein, the remote server 104 can receive, collect, store, and/or communicate transaction information 124 of a transaction that is associated with the user account 122. The transaction information 124 can describe the transaction associated with the user account 122 in any number of ways. For example, the transaction information 124 can include a transaction location 126 of the transaction associated with the user account 122 that describes the physical location of where the transaction was initiated. Alternatively or in addition, the transaction information 124 can include a description of a type of transaction such as a wire transfer, a cash withdrawal, a card payment, a cryptocurrency exchange, an online purchase, a purchase made in a brick-and-mortar store, and/or any other type of exchange of currency. Alternatively or in addition, the transaction information 124 can include a name of the establishment and/or store where the transaction took place. If the transaction associated with the user account 122 is any type of a purchase for goods, the transaction information 124 can include the type of goods that were purchased, such as the name of the item purchased. Alternatively or in addition, the transaction information 124 can include a value of the transaction associated with the user account 122, such as a dollar amount exchanged for goods.

Additionally, the remote server 104 can generate a one time password 128 in response to receiving the notification of the transaction that is associated with the user account 122. The one time password 128 is generated as a method of authenticating the transaction associated with the user account 122. Generally, a one time password is generated as a string of numbers, letters, symbols, and/or characters, and is then communicated to a user device for the user to enter into a graphical user interface of a website or device application in order to authenticate a transaction. For example, the one time password 128 can be communicated to the mobile device 102 via a standard text message, an email message, and/or a notification from a device application (e.g., the consumer application 118) prompting the user to authenticate the transaction associated with the user account 122 by entering the one time password into the consumer application 118 or a website associated with the user account.

In this example system 100 for location based transaction authentication, the mobile device 102 implements the transaction authentication manager 120 to receive the transaction location 126, the transaction information 124, and the one time password 128 from the remote server 104. For example, the remote server 104 may communicate the transaction location 126, the transaction information 124, and the one time password 128 to the mobile device 102 over the communication network 106. The transaction authentication manager 120 can receive the transaction location 126, the transaction information 124, and the one time password 128 as received by the mobile device 102 from the remote server 104.

In this example system 100, the transaction authentication manager 120 can generate an authentication message 130. In implementations, the transaction authentication manager 120 generates the authentication message 130 in response to receiving the transaction location 126, the transaction information 124, and the one time password 128 from the remote server 104. The authentication message 130 may include the one time password 128, the transaction information 124 which may include the transaction location 126, and an authentication prompt 132. The authentication prompt 132 can prompt the user of the mobile device 102 to authenticate the transaction associated with the user account 122 in various ways. For example, the authentication prompt 132 may prompt the user of the mobile device 102 to check a box indicating the user initiated the transaction associated with the user account 122. Alternatively or in addition, the authentication prompt 132 may prompt the user of the mobile device 102 to enter the one time password 128. In implementations, the authentication message 130 may be displayed on a display device of the mobile device 102. For example, the transaction authentication manager 120 can initiate a display of the authentication message 130 on the display device of the mobile device 102. The authentication message 130 can be delivered as any type of message, such as a notification from a device application (e.g., the consumer application 118), a standard text message, and/or an email message.

Additionally, the transaction authentication manager 120 can determine the device location 116. The transaction authentication manager 120 may determine the device location 116 in response to receiving the transaction location 126, the transaction information 124, and/or the one time password 128 from the remote server 104. For example, the transaction authentication manager 120 may signal the location service 114 to determine and communicate the device location 116 to the transaction authentication manager 120. The location service 114 may utilize one or more of a WI-FI® radio, a cellular radio, a global positioning satellite (GPS) radio, or any available type of device communication interface to determine the device location 116 of the mobile device 102.

In implementations of location based transaction authentication, as described herein, the transaction authentication manager 120 compares the transaction location 126 of the transaction associated with the user account 122 and the device location 116 of the mobile device 102. The transaction authentication manager 120 may determine that the transaction location 126 does not match the device location 116, as further described with reference to FIGS. 2 and 3, or the transaction authentication manager may determine that the transaction location matches the device location, as further described with reference to FIG. 3.

In the event that the transaction location 126 does not match the device location 116, the transaction authentication manager 120 may generate the authentication message 130 with the one time password 128, the transaction information 124 which may include the transaction location 126, and the authentication prompt 132. Prior to the display of the authentication message 130, the transaction authentication manager 120 can mask the one time password 128 in response to determining that the transaction location 126 does not match the device location 116. Then, the authentication message 130 may be displayed on the mobile device 102 for viewing with the one time password 128 that is masked such that the one time password is concealed from the user of the mobile device. For example, the transaction authentication manager 120 may replace all of the numbers, letters, symbols, and/or characters in the one time password 128 with a single character, such as an asterisk. The authentication message 130 can also be displayed with the transaction information 124 including the transaction location 126. The authentication message 130 can also be displayed with the authentication prompt 132 including a message alerting the user of the mobile device 102 to the potentially fraudulent transaction associated with the user account 122.

The authentication message 130 may then prompt the user of the mobile device 102 to indicate whether the transaction associated with the user account 122 is fraudulent or authentic and generate a user response 134. If the user of the mobile device 102 indicates via user input that the transaction associated with the user account 122 is authentic, then the transaction authentication manager 120 will reveal the one time password 128 such that the one time password is no longer masked and is visible to the user of the mobile device. For example, the transaction authentication manager 120 can reveal all of the numbers, letters, symbols, and/or characters of the one time password 128. The user of the mobile device 102 may then be prompted by the transaction authentication manager 120 to enter the one time password 128 via a graphical user interface (e.g., of the consumer application 118) to authenticate the transaction associated with the user account 122. The user response 134 may be communicated to the remote server 104 indicating that the transaction associated with the user account 122 is authentic in response to receiving the user input of the one time password 128. The remote server 104 can generate a transaction authentication 136 to authenticate the transaction associated with the user account. If the user of the mobile device 102 indicates via user input on the authentication prompt 132 of the authentication message 130 that the transaction associated with the user account 122 is fraudulent, then the transaction authentication manager 120 will maintain the one time password 128 as masked and generate the user response 134 to be communicated to the remote server 104. The user response 134 may indicate that the transaction is fraudulent, and the remote server 104 can flag the transaction associated with the user account 122 as fraudulent.

In an alternative implementation, the transaction authentication manager 120 determines that the transaction location 126 matches the device location 116. In this implementation, the transaction authentication manager 120 displays the authentication message 130 with the one time password 128, transaction information 124, and the authentication prompt 132. The one time password 128 does not need to be masked, but rather can be displayed for viewing on the display of the mobile device 102. For example, the numbers, letters, symbols, and/or characters of the one time password 128 can be immediately revealed to the user of the mobile device 102 in the authentication message 130. The authentication message may include the authentication prompt 132 that prompts the user to enter the one time password 128 via a graphical user interface of the consumer application 118, for example.

In the event that the user enters the one time password 128, the transaction authentication manager 120 can generate the user response 134 to be communicated to the remote server 104. The user response 134 can indicate to the remote server 104 that the transaction associated with the user account 122 is authentic, and the remote server generates the transaction authentication 136 to authenticate the transaction associated with the user account. However, if the user of the mobile device 102 indicates via user input on the authentication prompt 132 of the authentication message 130 that the transaction associated with the user account 122 is fraudulent, then the transaction authentication manager 120 can generate the user response 134 to be communicated to the remote server 104. The user response 134 may indicate that the transaction is fraudulent, and the remote server 104 flags the transaction associated with the user account 122 as fraudulent.

Figure 2:
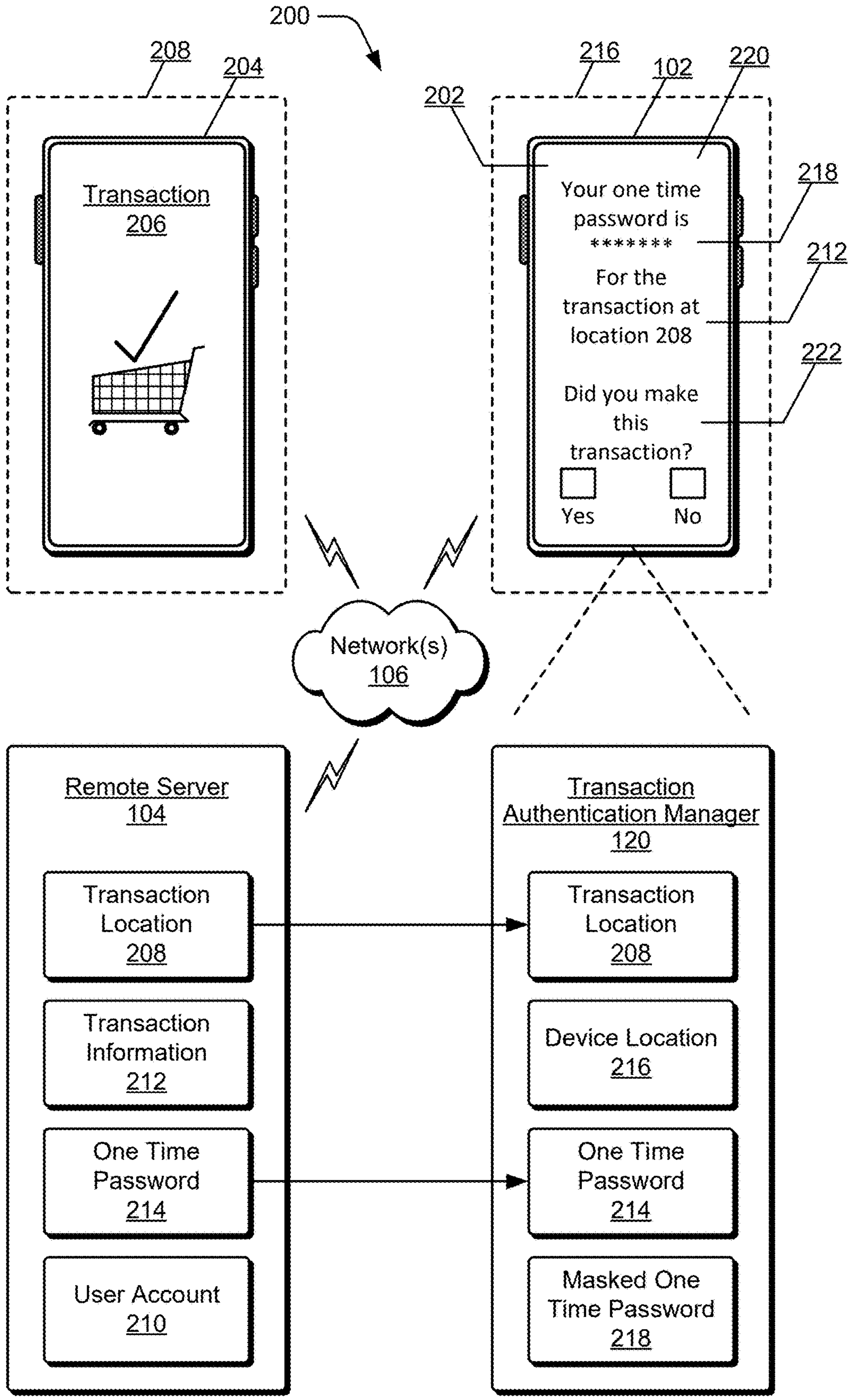
FIG. 2 further illustrates an example of location based transaction authentication in accordance with one or more implementations as described herein.

FIG. 2 illustrates example 200 of location based transaction authentication, as described herein. Generally, the example 200 includes the mobile device 102, the remote server 104, and the communication network 106 which can be utilized to implement features and techniques of location based transaction authentication, such as shown and described with reference to FIG. 1. In this example 200, the mobile device 102 may communicate information with the remote server 104 over the communication network 106. Additionally, the mobile device 102 is implemented with a display device 202 on which an application user interface may be displayed. The mobile device 102 may also be implemented with the transaction authentication manager 120, such as shown and described with reference to FIG. 1. As shown in this example 200, the transaction authentication manager 120 represents functionality (e.g., logic, software, and/or hardware) enabling aspects of the described techniques for location based transaction authentication.

In implementations of location based transaction authentication, as described herein, the example 200 also includes a transaction device 204. The transaction device 204 also may be any type of a wireless device, mobile device, mobile phone, flip phone, client device, companion device, tablet, computing device, communication device, entertainment device, gaming device, media playback device, or any other type of computing, consumer, and/or electronic device capable of initiating a transaction. Notably in this example, the transaction device 204 may or may not be the same device as the mobile device 102. In some scenarios, a user can place an order from the mobile device 102 and receive an SMS, or the user can place an order from a home computer while having his phone (e.g., the mobile device 102) nearby. However, a fraudulent order can also be placed from an unknown location using the user's phone number or email account.

The transaction device 204 may initiate a transaction 206 at a transaction location 208. The remote server 104 can receive a notification of the transaction 206 that is associated with a user account 210. The user account 210 can be any type of account that is linked to transactions, such as a mobile banking account, a digital banking account, and/or a consumer account. In implementations, the user account 210 is associated with a user of the mobile device 102. For example, the user account 210 can be associated with a mobile phone number of the mobile device 102, an IP address of the mobile device, and/or any other mobile device identification information. The user account 210 may also be linked to the mobile device 102 through a consumer application of the mobile device, which can be a mobile banking application, digital banking application, and/or any other application that processes and/or tracks transactions linked to the mobile device and/or to a user of the mobile device.

In implementations of location based transaction authentication, as described herein, the remote server 104 can receive, collect, store, and/or communicate transaction information 212 of the transaction 206 that is associated with the user account 210. The transaction information 212 can describe the transaction 206 in any number of ways. For example, the transaction information 212 can include the transaction location 208 of the transaction 206, which describes the physical location where the transaction was initiated. Alternatively or in addition, the transaction information 212 can include a description of a type of the transaction, such as a wire transfer, a cash withdrawal, a card payment, a cryptocurrency exchange, an online purchase, a purchase made in a brick-and-mortar store, and/or any other type of exchange of currency. Alternatively or in addition, the transaction information 212 can include a name of the establishment and/or store where the transaction took place. If the transaction 206 associated with the user account 210 is any type of a purchase for goods, the transaction information 212 can include the type of goods that were purchased, such as the name of the item purchased. Alternatively or in addition, the transaction information 212 can include a value of the transaction 206, such as a dollar amount exchanged for goods.

In this example 200, the remote server can generate a one time password 214 in response to receiving the notification of the transaction 206 that is associated with the user account 210. The one time password 214 is generated as a method of authenticating the transaction 206. As described above, a one time password is generated as a string of numbers, letters, symbols, and/or characters and communicated to a user device for the user to enter into a graphical user interface of a website or device application in order to authenticate a transaction. For example, the one time password 214 can be communicated to the mobile device 102 via a standard text message and/or an email message prompting the user to authenticate the transaction 206 associated with the user account 210 by entering the one time password into a graphical user interface of a consumer application on the mobile device or a website associated with the user account.

In one or more implementations, the transaction authentication manager 120 can determine a device location 216 describing the location in which the mobile device 102 is physically located. The transaction authentication manager 120 may determine the device location 216 in response to receiving the transaction location 208, the transaction information 212, and/or the one time password 214 from the remote server 104. The mobile device 102 can implement a location service to determine the device location 216 of the mobile device 102, utilizing one or more of a WI-FI® radio, a cellular radio, a global positioning satellite (GPS) radio, or any available type of device communication interface to determine the device location of the mobile device.

Additionally, the transaction authentication manager 120 can compare the transaction location 208 of the transaction 206 associated with the user account 210 and the device location 216 of the mobile device 102. The transaction authentication manager 120 may make the comparison in response to determining the device location 216. Additionally or alternatively, the transaction authentication manager 120 can make the comparison in response to receiving the transaction location 208, the transaction information 212, and/or the one time password 214 from the remote server 104. The transaction authentication manager 120 may determine that the transaction location 208 does not match the device location 216, or the transaction authentication manager may determine that the transaction location does match the device location. In this example 200, the transaction authentication manager 120 determines that the transaction location 208 does not match the device location 216.

In this example 200, the transaction authentication manager 120 generates a masked one time password 218 in response to determining that the transaction location 208 of the transaction 206 does not match the device location 216 of the mobile device 102. The transaction authentication manager 120 can generate the masked one time password 218 by concealing the one time password 214 from the user of the mobile device 102. For example, the transaction authentication manager 120 may generate the masked one time password 218 by replacing the numbers, letters, symbols, and/or characters in the one time password 214 with a single repeating character, such as an asterisk.

In one or more implementations, the transaction authentication manager 120 can generate an authentication message 220 for output on the display device 202 of the mobile device 102. The transaction authentication manager 120 may generate the authentication message 220 in response to receiving the transaction location 208, the transaction information 212, and/or the one time password 214 from the remote server 104. Alternatively or in addition, the transaction authentication manager 120 may generate the authentication message 220 in response to comparing the transaction location 208 and the device location 216. Alternatively, or in addition, the transaction authentication manager 120 can generate the authentication message 220 in response to generating the masked one time password 218. The authentication message 220 may include one or more of a notification from a device application (e.g., a mobile banking application), a standard text message, an email message, or any type of message that will notify the user of the mobile device 102.

If the transaction authentication manager 120 determines that the transaction location 208 does not match the device location 216, the authentication message 220 can include the masked one time password 218, the transaction information 212 which may include the transaction location 208, and an authentication prompt 222. The authentication prompt 222 may include text to alert the user of the mobile device 102 to the transaction 206 associated with the user account 210 that is potentially fraudulent. For example, the authentication prompt 222 may ask the user of the mobile device 102, "Did you make this transaction?" The authentication prompt 222 may prompt the user of the mobile device 102 to input, via a graphical user interface, whether the transaction 206 associated with the user account 210 is authentic or fraudulent.

In one or more implementations, the transaction authentication manager 120 receives input via the display device 202 of the mobile device 102 indicating that the user of the mobile device is authenticating the transaction 206 associated with the user account 210. In this implementation, the transaction authentication manager 120 receives the input indicating that the transaction 206 associated with the user account 210 is authentic and reveals the one time password 214 on the display device 202 of the mobile device 102. For example, the transaction authentication manager 120 can replace the single repeating character, such as the asterisk, of the masked one time password 218 with the original numbers, letters, symbols, and/or characters of the one time password 214 that were generated by the remote server 104 and communicated to the mobile device 102. The authentication message 220 can then prompt the user of the mobile device 102 to enter the one time password 214 via a graphical user interface on the display device 202 (e.g., a GUI of a mobile banking application on the mobile device 102) to authenticate the transaction 206 associated with the user account 210. If the user of the mobile device 102 enters the one time password 214, the transaction authentication manager 120 may communicate a user response to the remote server 104 indicating that the transaction 206 is authentic. In this manner, the transaction authentication manager 120 can initiate an authentication of the transaction 206 associated with the user account 210.

In one or more implementations, the transaction authentication manager 120 receives input via the display device 202 of the mobile device 102 indicating that the user of the mobile device is claiming the transaction 206 associated with the user account 210 is fraudulent. In this implementation, the transaction authentication manager 120 will maintain the masked one time password 218 to conceal the one time password 214 from the user of the mobile device 102. In this way, the user of the mobile device 102 cannot be tricked into sharing the one time password 218 with a fraudster because the user doesn't even know the password. The transaction authentication manager 120 can also communicate a user response to the remote server 104 indicating that the transaction 206 associated with the user account 210 is fraudulent. In this manner, the transaction authentication manager 120 may initiate a flagging of the transaction 206 associated with the user account 210 as fraudulent.

If the transaction authentication manager 120 determines that the transaction location 208 does match the device location 216, the authentication message 220 can include the one time password 214, the transaction information 212 which may include the transaction location 208, and the authentication prompt 222. The one time password 214 is revealed on the display device 202 of the mobile device 102 without masking in response to determining that the transaction location 208 matches the device location 216. The authentication prompt 222 may prompt the user of the mobile device 102 to enter the one time password 214 via a graphical user interface on the display device 202 (e.g., a GUI of a mobile banking application on the mobile device 102) to authenticate the transaction 206 associated with the user account 210. If the user of the mobile device 102 enters the one time password 214, the transaction authentication manager 120 may communicate a user response to the remote server 104 indicating that the transaction 206 is authentic. In this manner, the transaction authentication manager 120 can initiate an authentication of the transaction 206 associated with the user account 210. Alternatively, the user of the mobile device 102 may not enter the one time password 214. In this implementation, the transaction authentication manager 120 may communicate a user response to the remote server 104 indicating that the transaction 206 is fraudulent. The transaction authentication manager 120 can also initiate a flagging of the transaction 206 associated with the user account 210 as fraudulent.

Figure 3:
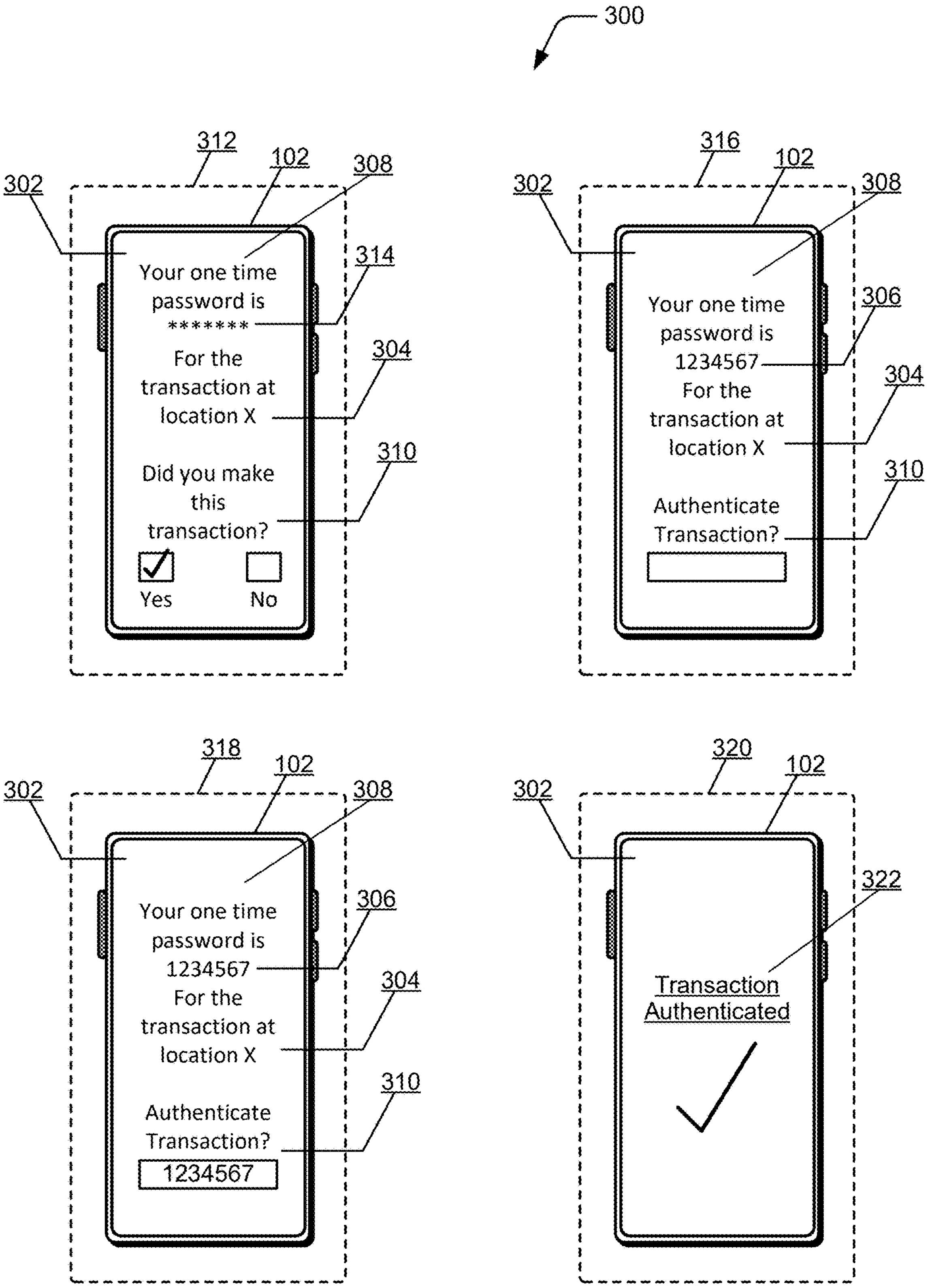
FIG. 3 illustrates examples of features for location based transaction authentication with one or more implementation as described herein.

FIG. 3 illustrates examples 300 of features of the techniques for location based transaction authentication, as described herein. The mobile device 102 can be implemented with a display device 302 with a graphical user interface. As described above, the transaction authentication manager 120 that is implemented by the mobile device 102 can receive a notification of a transaction associated with a user account. The transaction authentication manager can also receive transaction information 304 that includes at least a transaction location and a one time password 306. The transaction authentication manager 120 can determine a device location of the mobile device 102 to compare to the transaction location included in the transaction information 304. The transaction authentication manager can also generate an authentication message 308 that includes an authentication prompt 310 for output on the display device 302 of the mobile device 102.

In the examples 300, the display device 302 of the mobile device 102 is shown at different instances of the authentication process for location based transaction authentication. For example, if the transaction authentication manager 120 determines that the device location of the mobile device 102 does not match the transaction location of the transaction associated with the mobile device user's account, the mobile device is first shown at instance 312. In the instance 312, the transaction authentication manager implemented by the mobile device 102 can mask the one time password 306 to generate a masked one time password 314. The authentication message 308 shows the masked one time password 314, which is masked on the display device 302 by the transaction authentication manager by concealing the one time password 306. For example, the transaction authentication manager 120 may generate the masked one time password 314 by replacing the numbers, letters, symbols, and/or characters in the one time password 306 with a single repeating character, such as an asterisk.

The authentication message 308 at the instance 312 also shows the transaction information 304 including the transaction location of the transaction associated with the mobile device user's account. The authentication message 308 at the instance 312 also shows the authentication prompt 310 that may alert the user of the mobile device 102 to the potentially fraudulent transaction associated with the mobile device user's account. At the instance 312, the mobile device receives input to authenticate the transaction associated with the mobile device user's account at the authentication prompt 310.

At an instance 316, the transaction authentication manager 120 implemented by the mobile device 102 changes the authentication message 308 on the display device 302. In response to receiving the input on the authentication prompt 310 at the instance 312 to authenticate the transaction associated with the mobile device user's account, the transaction authentication manager can reveal the one time password 306. For example, the transaction authentication manager 120 can replace the single character, such as the asterisk, of the masked one time password 314 with the original numbers, letters, symbols, and/or characters of the one time password 306. At the instance 316, the transaction authentication manager may also change the authentication prompt 310 to prompt the user of the mobile device 102 to input the one time password 306. The authentication prompt 310 may ask for input of the one time password 306 directly into the authentication message 308. Alternatively or in addition, the authentication prompt 310 at the instance 316 may prompt the user of the mobile device 102 to input the one time password 306 into a graphical user interface of a website and/or a device application, such as the consumer application as described and shown with reference to FIG. 1.

At an instance 318, the transaction authentication manager 120 implemented by the mobile device 102 receives input on the display device 302 from the user of the mobile device entering the one time password 306 into the authentication prompt 310 of the authentication message 308. The mobile device 102 may receive the input from the user of the mobile device entering the one time password 306 directly into the authentication prompt 310 on the authentication message 308. Alternatively or in addition, the user of the mobile device 102 can input the one time password 306 into a graphical user interface of a website and/or a device application, such as the consumer application as described and shown with reference to FIG. 1. In this implementation, the transaction authentication manager 120 receives a notification that the user of the mobile device has entered the one time password 306 into the graphical user interface.

At an instance 320, the mobile device 102 initiates a transaction authentication 322 of the transaction associated with the mobile device user's account. For example, the transaction authentication manager 120 can generate a user response to authenticate the transaction in response to receiving the input of the one time password 306 at the authentication prompt 310. The transaction authentication manager may communicate the user response to a remote server, such as the remote server 104 as described and shown with reference to FIGS. 1 and 2. In this manner, the transaction authentication manager implemented by the mobile device 102 may initiate the transaction authentication 322 of the transaction associated with the mobile device user's account.

In implementations of location based transaction authentication, as described herein, the transaction authentication manager 120 can determine that the transaction location included in the transaction information 304 matches the device location of the mobile device 102. In this alternative implementation, the transaction authentication manager 120 initiates the various user interface displays on the display device 302 shown at the instances 316, 318, and 320. In response to determining that the transaction location matches the device location, the transaction authentication manager may not generate the display device 302 of the masked one time password 314 at the instance 312, but rather reveal the one time password 306 on the display device 302 at the instance 316. The transaction authentication manager 120 can initiate the transaction authentication 322 at the instance 320 in response to the user input received on the authentication prompt 310 at the instance 318.

Example methods 400, 500, and 600 are described with reference to respective FIGS. 4, 5, and 6 in accordance with one or more implementations of location based transaction authentication, as described herein. Generally, any services, components, modules, managers, controllers, methods, and/or operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like.

Figure 4:
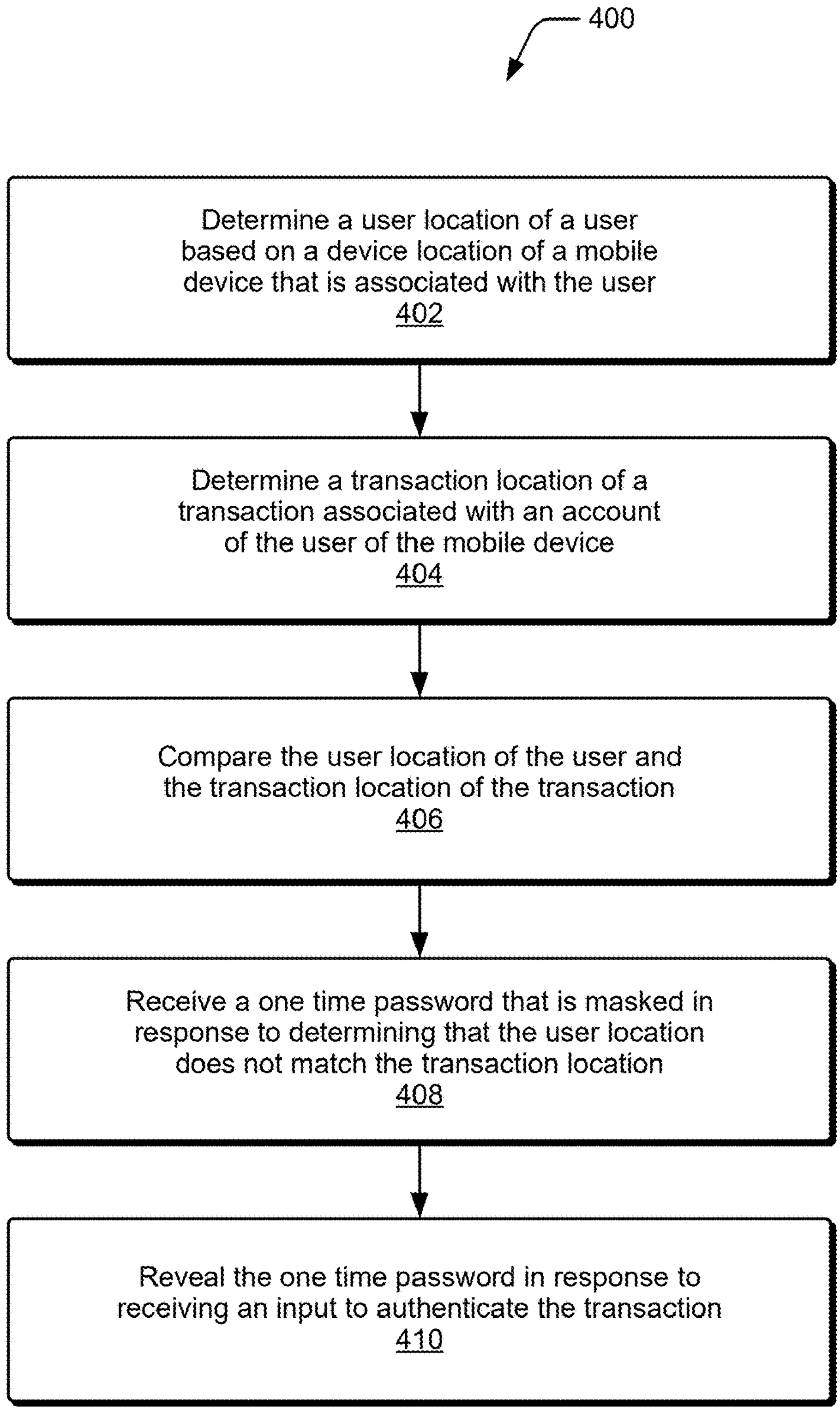
FIGS. 4-6 illustrate example methods for location based transaction authentication in accordance with one or more implementations of the techniques described herein.

FIG. 4 illustrates example method(s) 400 for location based transaction authentication. The order in which the method is described is not intended to be construed as a limitation, and any number or combination of the described method operations may be performed in any order to perform a method, or an alternate method.

At 402, a user location of a user is determined based on a device location of a mobile device that is associated with the user. For example, the transaction authentication manager 120 can determine the user location by utilizing the location service 114 to determine the device location 116 of the mobile device 102.

At 404, a transaction location of a transaction associated with an account of the user of the mobile device is determined. For example, the transaction authentication manager 120 can receive the transaction location 126 from the remote server 104 as communicated over the communication network 106 to the mobile device 102. The transaction location 126 can describe the physical location of where the transaction associated with the user account 122 was initiated. The transaction location 126 may be received by the transaction authentication manager 120 as part of the transaction information 124. The transaction information 124 may also include any information associated with the transaction of the user account 122, such as the type of transaction, the name of the establishment and/or store where the transaction took place, the type of goods purchased, and/or a value of the transaction.

At 406, the user location of the user and the transaction location of the transaction are compared. For example, the transaction authentication manager 120 can compare the transaction location 126 of the transaction associated with the user account 122 and the device location 116 of the mobile device 102.

At 408, a one time password that is masked is received in response to determining that the user location does not match the transaction location. For example, the transaction authentication manager 120 may generate the authentication message 130 and mask the one time password 128 such that the one time password 128 is concealed from the user of the mobile device 102. The transaction authentication manager 120 can replace all of the numbers, letters, symbols, and/or characters in the one time password 128 with a single repeating character, such as an asterisk. The one time password 128 that is masked in the authentication message 130 may be received as any type of message, such as a notification from a device application (e.g., the consumer application 118), a standard text message, and/or an email message.

At 410, the one time password is revealed in response to receiving an input to authenticate the transaction. For example, the transaction authentication manager 120 may receive input via a graphical user interface of the mobile device 102 that the transaction associated with the user account 122 is authentic, and reveal the one time password 128 such that the one time password is no longer masked and is visible to the user of the mobile device. The transaction authentication manager 120 may reveal all of the numbers, letters, symbols, and/or characters of the one time password 128. The one time password 128 that is revealed may be received as any type of message, such as a notification from a device application (e.g., the consumer application 118), a standard text message, and/or an email message.

Figure 5:
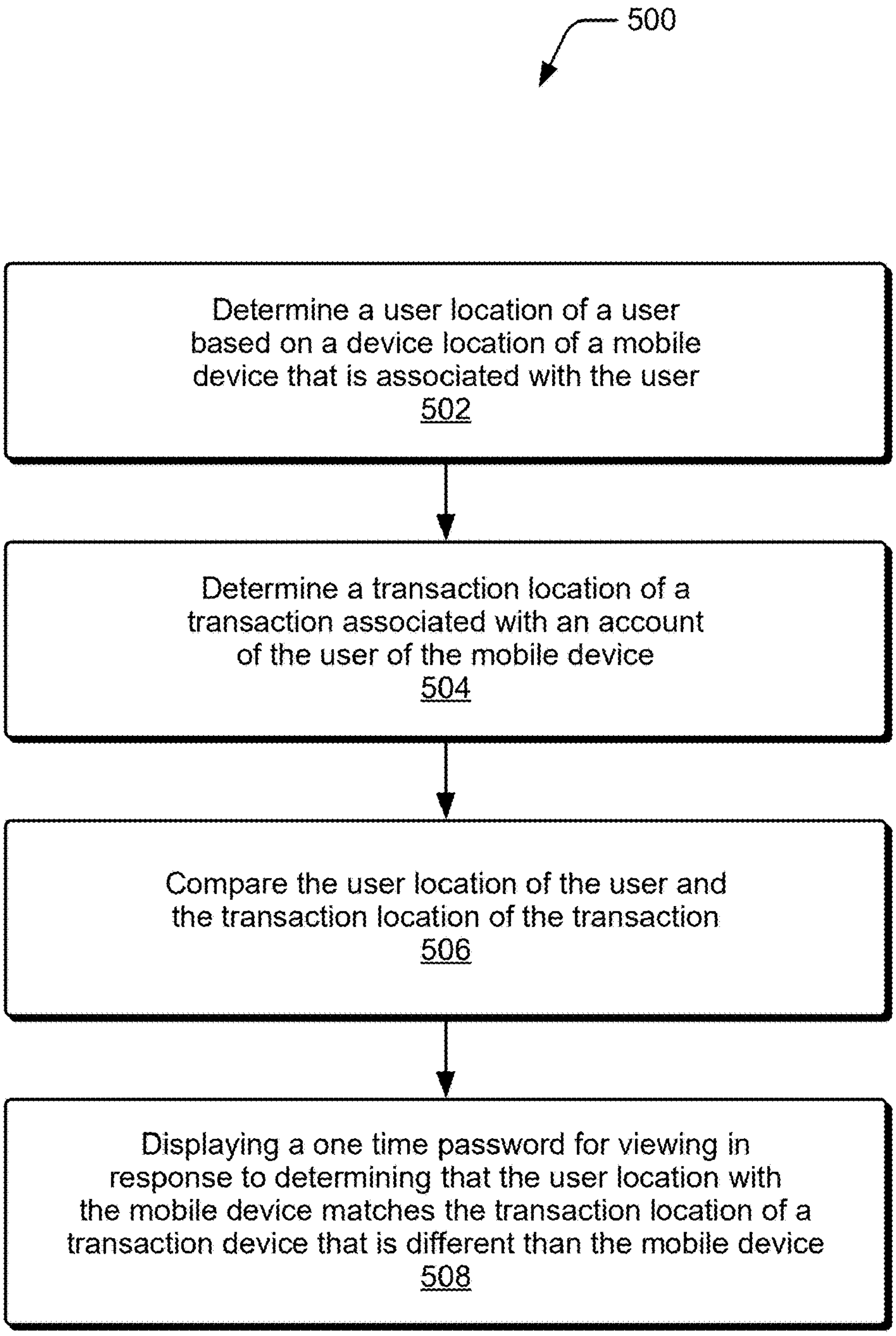

FIG. 5 illustrates example method(s) 500 for location based transaction authentication. The order in which the method is described is not intended to be construed as a limitation, and any number or combination of the described method operations may be performed in any order to perform a method, or an alternate method.

At 502, a user location of a user is determined based on a device location of a mobile device that is associated with the user. For example, the transaction authentication manager 120 may determine the user location by utilizing the location service 114 to determine the device location 116 of the mobile device 102.

At 504, a transaction location of a transaction associated with an account of the user of the mobile device is determined. For example, the transaction authentication manager 120 can receive the transaction location 126 from the remote server 104 as communicated over the communication network 106 to the mobile device 102. The transaction location 126 can describe the physical location of where the transaction associated with the user account 122 was initiated. The transaction location 126 may be received by the transaction authentication manager 120 as part of the transaction information 124. The transaction information 124 may also include any information associated with the transaction of the user account 122, such as the type of transaction, the name of the establishment and/or store where the transaction took place, the type of goods purchased, and/or a value of the transaction.

At 506, the user location of the user and transaction location of the transaction are compared. For example, the transaction authentication manager 120 can compare the transaction location 126 of the transaction associated with the user account 122 and the device location 116 of the mobile device 102.

At 508, a one time password is displayed for viewing in response to determining that the user location with the mobile device matches the transaction location of a transaction device that is different than the mobile device. For example, the transaction authentication manager 120 determines that the transaction location 126 of the transaction associated with the user account 122 matches the device location 116 of the mobile device 102. In a further scenario, the transaction device 204 may or may not be the same device as the mobile device 102. In response, the transaction authentication manager 120 displays, rather than masks, the one time password 128 for display on a display device of the mobile device 102. The transaction authentication manager 120 can determine that the transaction location 126 of the transaction device corresponds to the transaction that is initiated on the transaction device with the user account of the user who is associated with the mobile device 102 (e.g., on the consumer application 118).

Figure 6:
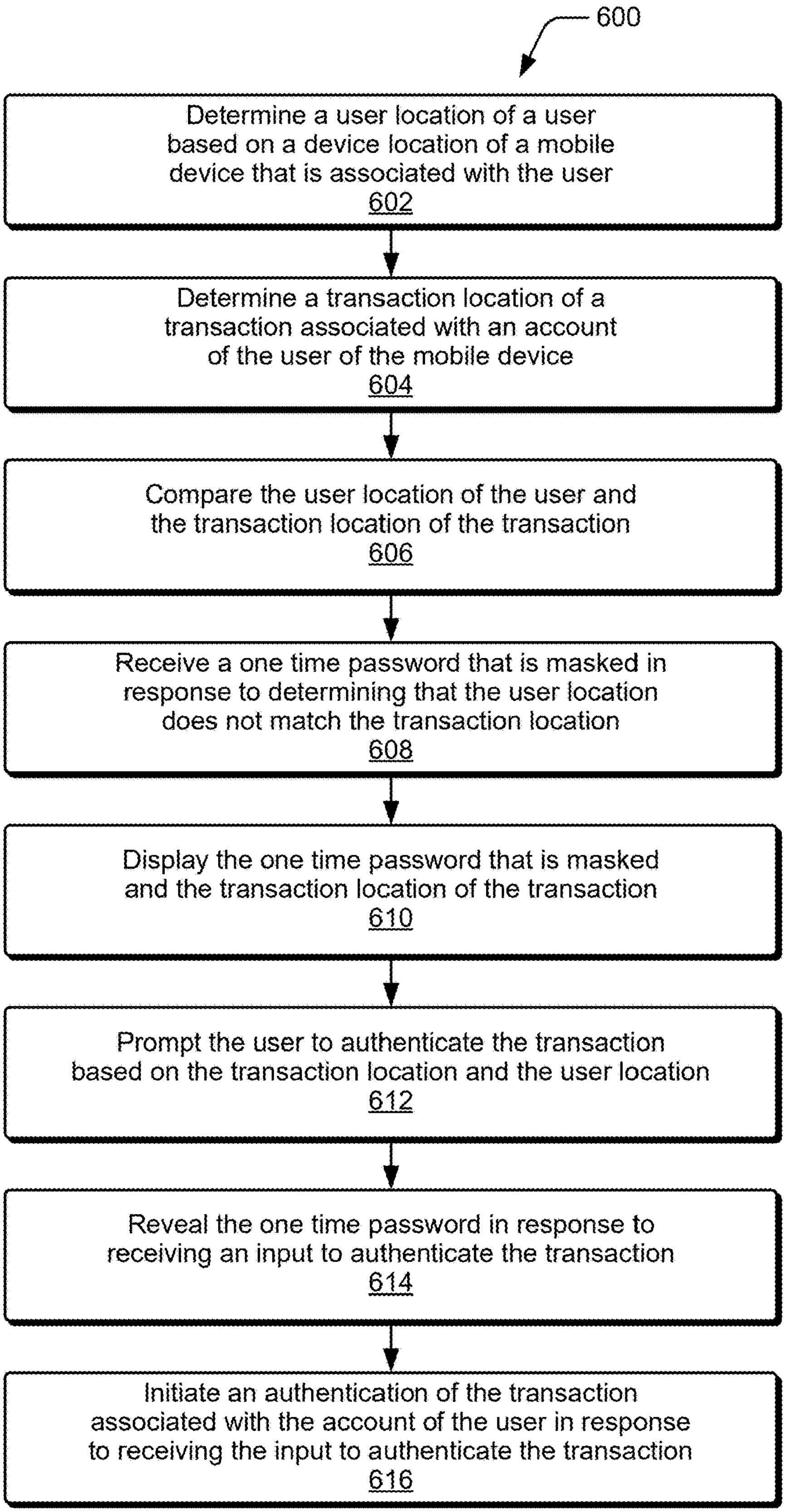

FIG. 6 illustrates example method(s) 600 for location based transaction authentication. The order in which the method is described is not intended to be construed as a limitation, and any number or combination of the described method operations may be performed in any order to perform a method, or an alternate method.

At 602, a user location of a user is determined based on a device location of a mobile device that is associated with the user. For example, the transaction authentication manager 120 may determine the user location by utilizing the location service 114 to determine the device location 116 of the mobile device 102.

At 604, a transaction location of a transaction associated with an account of the user of the mobile device is determined. For example, the transaction authentication manager 120 can receive the transaction location 126 from the remote server 104 as communicated over the communication network 106 to the mobile device 102. The transaction location 126 can describe the physical location of where the transaction associated with the user account 122 was initiated. The transaction location 126 may be received by the transaction authentication manager 120 as part of the transaction information 124. The transaction information 124 may also include any information associated with the transaction of the user account 122 such as the type of transaction, the name of the establishment and/or store where the transaction took place, the type of goods purchased, and/or a value of the transaction.

At 606, the user location of the user and transaction location of the transaction are compared. For example, the transaction authentication manager 120 can compare the transaction location 126 of the transaction associated with the user account 122 and the device location 116 of the mobile device 102.

At 608, a one time password that is masked is received in response to determining that the user location does not match the transaction location. For example, the transaction authentication manager 120 may generate the authentication message 130 and mask the one time password 128 such that the one time password 128 is concealed from the user of the mobile device 102. The transaction authentication manager 120 may replace all of the numbers, letters, symbols, and/or characters in the one time password 128 with a single repeating character, such as an asterisk. The one time password 128 that is masked in the authentication message 130 may be received as any type of message, such as a notification from a device application (e.g., the consumer application 118), a standard text message, and/or an email message.

At 610, the one time password that is masked and the transaction location of the transaction are displayed. For example, the transaction authentication manager 120 may initiate a display on the display device of the mobile device 102 of the one time password 128 that is masked and the transaction location 126 that is part of the transaction information 124. The transaction authentication manager 120 may initiate this display as part of the authentication message 130. The authentication message 130 including at least the one time password 128 that is masked and/or the transaction information 124 that includes the transaction location 126 can be delivered as any type of message, such as a notification from a device application (e.g., the consumer application 118), a standard text message, and/or an email message.

At 612, the user is prompted to authenticate the transaction based on the transaction location and the user location. For example, the transaction authentication manager 120 includes the authentication prompt 132 in the authentication message 130. The authentication prompt 132 may prompt the user of the mobile device 102 to indicate, via input on a graphical user interface of the display device of the mobile device, whether the transaction associated with the user account 122 is authentic by indicating that the device location 116 of the mobile device does not match the transaction location of the transaction associated with the user account.

At 614, the one time password is revealed in response to receiving an input to authenticate the transaction. For example, the transaction authentication manager 120 may receive input via a graphical user interface of the mobile device 102 that the transaction associated with the user account 122 is authentic, and reveal the one time password 128 such that the one time password is no longer masked and is visible to the user of the mobile device. The transaction authentication manager 120 may reveal all of the numbers, letters, symbols, and/or characters of the one time password 128. The one time password 128 that is revealed may be received as an email message and/or a standard text message.

At 616, an authentication of the transaction associated with the account of the user is initiated in response to receiving the input to authenticate the transaction. For example, the transaction authentication manager 120 may generate the user response 134 to be communicate to the remote server 104 over the communication network 106 in response to receiving input indicating that the transaction associated with the user account 122 is authentic. The input may be the user entering the one time password 128 via a graphical user interface (e.g., of the consumer application 118) to authenticate the transaction associated with the user account 122. The user response 134 may signal the remote server 104 to generate the transaction authentication 136.

Figure 7:
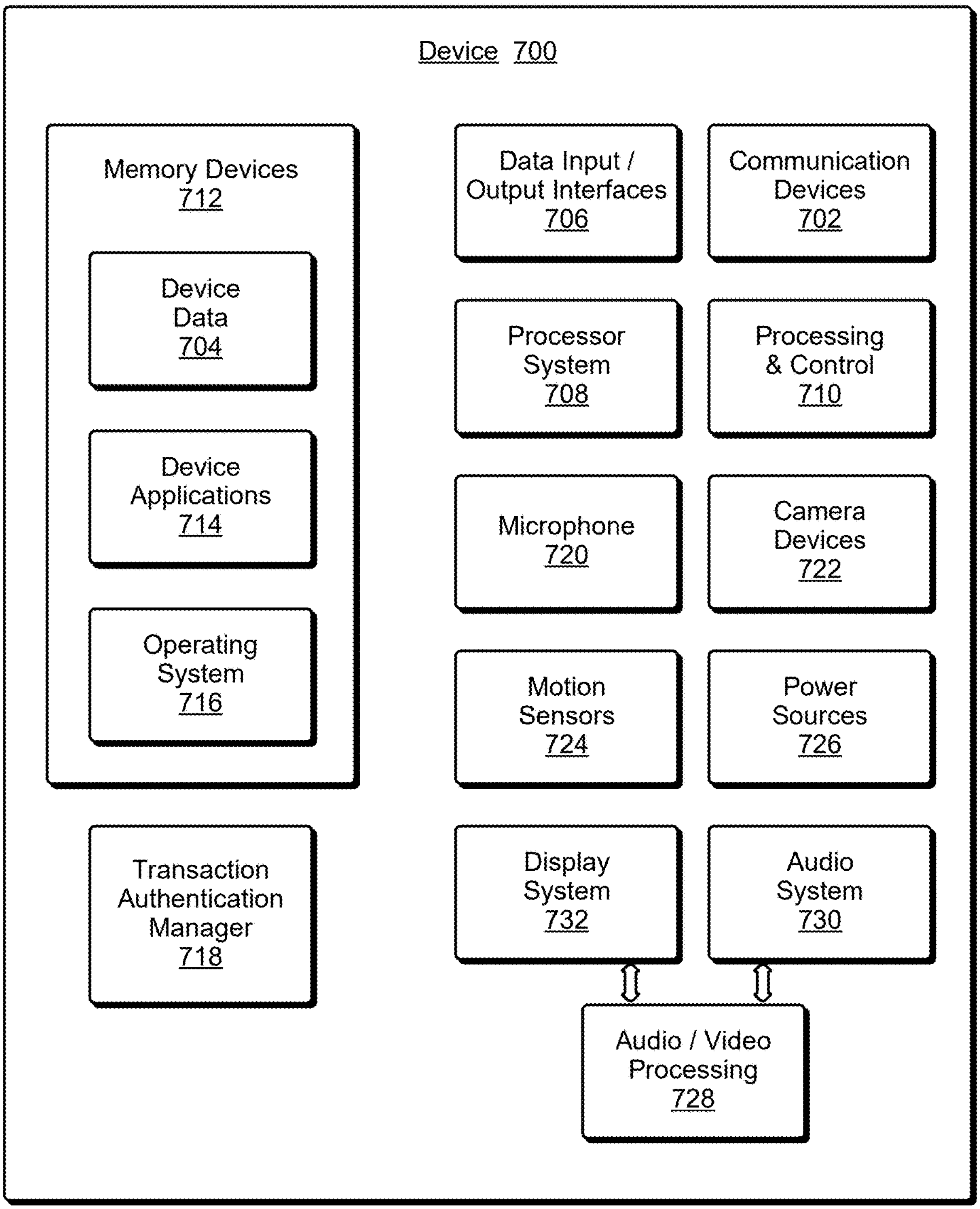
FIG. 7 illustrates various components of an example device that may be used to implement the techniques for location based transaction authentication as described herein.

FIG. 7 illustrates various components of an example device 700, which can implement aspects of the techniques and features for location based transaction authentication, as described herein. The example device 700 may be implemented as any of the devices described with reference to the previous FIGS. 1-6, such as any type of a wireless device, mobile device, mobile phone, flip phone, client device, companion device, display device, tablet, computing, communication, entertainment, gaming, media playback, and/or any other type of computing and/or electronic device. For example, the mobile device 102 and/or the remote server 104 described with reference to FIGS. 1-6 may be implemented as the example device 700.

The example device 700 can include various, different communication devices 702 that enable wired and/or wireless communication of device data 704 with other devices. The device data 704 can include any of the various devices data and content that is generated, processed, determined, received, stored, and/or communicated from one computing device to another. Generally, the device data 704 can include any form of audio, video, image, graphics, and/or electronic data that is generated by applications executing on a device. The communication devices 702 can also include transceivers for cellular phone communication and/or for any type of network data communication.

The example device 700 can also include various, different types of data input/output (I/O) interfaces 706, such as data network interfaces that provide connection and/or communication links between the devices, data networks, and other devices. The I/O interfaces 706 may be used to couple the device to any type of components, peripherals, and/or accessory devices, such as a computer input device that may be integrated with the example device 700. The I/O interfaces 706 may also include data input ports via which any type of data, information, media content, communications, messages, and/or inputs may be received, such as user inputs to the device, as well as any type of audio, video, image, graphics, and/or electronic data received from any content and/or data source.

The example device 700 includes a processor system 708 of one or more processors (e.g., any of microprocessors, controllers, and the like) and/or a processor and memory system implemented as a system-on-chip (SoC) that processes computer-executable instructions. The processor system 708 may be implemented at least partially in computer hardware, which can include components of an integrated circuit or on-chip system, an application-specific integrated circuit (ASIC), a field-programmable gate array (FPGA), a complex programmable logic device (CPLD), and other implementations in silicon and/or other hardware. Alternatively, or in addition, the device may be implemented with any one or combination of software, hardware, firmware, or fixed logic circuitry that may be implemented in connection with processing and control circuits, which are generally identified at 710. The example device 700 may also include any type of a system bus or other data and command transfer system that couples the various components within the device. A system bus can include any one or combination of different bus structures and architectures, as well as control and data lines.

The example device 700 also includes memory and/or memory devices 712 (e.g., computer-readable storage memory) that enable data storage, such as data storage devices implemented in hardware which may be accessed by a computing device, and that provide persistent storage of data and executable instructions (e.g., software applications, programs, functions, and the like). Examples of the memory devices 712 include volatile memory and non-volatile memory, fixed and removable media devices, and any suitable memory device or electronic data storage that maintains data for computing device access. The memory devices 712 can include various implementations of random-access memory (RAM), read-only memory (ROM), flash memory, and other types of storage media in various memory device configurations. The example device 700 may also include a mass storage media device.

The memory devices 712 (e.g., as computer-readable storage memory) provide data storage mechanisms, such as to store the device data 704, other types of information and/or electronic data, and various device applications 714 (e.g., software applications and/or modules). For example, an operating system 716 may be maintained as software instructions with a memory device 712 and executed by the processor system 708 as a software application. The device applications 714 may also include a device manager, such as any form of a control application, software application, signal-processing and control module, code that is specific to a particular device, a hardware abstraction layer for a particular device, and so on.

In this example, the device 700 includes a transaction authentication manager 718 that implements various aspects of the described features and techniques described herein. The transaction authentication manager 718 may be implemented with hardware components and/or in software as one of the device applications 714, such as when the example device 700 is implemented as the mobile device 102 described with reference to FIGS. 1-6. An example of the transaction authentication manager 718 is the transaction authentication manager 120 implemented by the mobile device 102, such as a software application and/or as hardware components in the mobile device. In implementations, the transaction authentication manager 718 may include independent processing, memory, and logic components as a computing and/or electronic device integrated with the example device 700.

The example device 700 can also include a microphone 720 (e.g., to capture an audio recording of a user) and/or camera devices 722 (e.g., to capture video images of the user during a call), as well as motion sensors 724, such as may be implemented as components of an inertial measurement unit (IMU). The motion sensors 724 may be implemented with various sensors, such as a gyroscope, an accelerometer, and/or other types of motion sensors to sense motion of the device. The motion sensors 724 can generate sensor data vectors having three-dimensional parameters (e.g., rotational vectors in x, y, and z-axis coordinates) indicating location, position, acceleration, rotational speed, and/or orientation of the device. The example device 700 can also include one or more power sources 726, such as when the device is implemented as a wireless device and/or mobile device. The power sources may include a charging and/or power system, and may be implemented as a flexible strip battery, a rechargeable battery, a charged super-capacitor, and/or any other type of active or passive power source.

The example device 700 can also include an audio and/or video processing system 728 that generates audio data for an audio system 730 and/or generates display data for a display system 732. The audio system and/or the display system may include any types of devices or modules that generate, process, display, and/or otherwise render audio, video, display, and/or image data. Display data and audio signals may be communicated to an audio component and/or to a display component via any type of audio and/or video connection or data link. In implementations, the audio system and/or the display system are integrated components of the example device 700. Alternatively, the audio system and/or the display system are external, peripheral components to the example device.

Although implementations for location based transaction authentication have been described in language specific to features and/or methods, the appended claims are not necessarily limited to the specific features or methods described. Rather, the specific features and methods are disclosed as example implementations for location based transaction authentication, and other equivalent features and methods are intended to be within the scope of the appended claims. Further, various different examples are described, and it is to be appreciated that each described example may be implemented independently or in connection with one or more other described examples. Additional aspects of the techniques, features, and/or methods discussed herein relate to one or more of the following:

A mobile device, comprising: a location service to determine a device location of the mobile device; and a transaction authentication manager implemented at least partially in hardware and configured to: receive a transaction location of a transaction associated with an account of a user of the mobile device; compare the device location of the mobile device to the transaction location of the transaction; receive a one time password that is masked in response to determining that the device location does not match the transaction location; and reveal the one time password in response to receiving an input on the mobile device to authenticate the transaction.

Alternatively, or in addition to the above-described mobile device, any one or combination of: the one time password is masked to conceal the one time password from the user of the mobile device. The transaction is initiated on a transaction device that is different than the mobile device, and transaction location corresponds to the transaction initiated on the transaction device with the account of the user associated with the mobile device. The transaction authentication manager is configured to initiate a display of the one time password on a display device of the mobile device in response to determining that the device location of the mobile device matches the transaction location of the transaction device. The transaction authentication manager is configured to initiate a display of the one time password that is masked and the transaction location of the transaction; and prompt the user to authenticate the transaction based on the transaction location and the device location of the mobile device. The transaction authentication manager is configured to initiate an authentication of the transaction associated with the account of the user in response to receiving the input to authenticate the transaction. The one time password is received in at least one of an email message or a standard text message.

A method, comprising: determining a user location of a user based on a device location of a mobile device that is associated with the user; determining a transaction location of a transaction associated with an account of the user of the mobile device; comparing the user location of the user and the transaction location of the transaction; receiving a one time password that is masked in response to determining that the user location does not match the transaction location; and revealing the one time password in response to receiving an input to authenticate the transaction.

Alternatively, or in addition to the above-described method, any one or combination of: the one time password is masked to conceal the one time password from the user. The transaction is initiated on a transaction device that is different than the mobile device, and the transaction location corresponds to the transaction initiated on the transaction device with the account of the user associated with the mobile device. The method further comprising displaying the one time password for viewing in response to determining that the user location with the mobile device matches the transaction location of the transaction device. The method further comprising displaying the one time password that is masked and the transaction location of the transaction; and prompting the user to authenticate the transaction based on the transaction location and the user location. The method further comprising initiating an authentication of the transaction associated with the account of the user in response to receiving the input to authenticate the transaction. The one time password is received as at least one of an email message or a standard text message.

A system, comprising: a mobile device that is associated with a consumer account of a user; and a transaction authentication manager implemented at least partially in hardware and configured to: compare a device location of the mobile device with a transaction location of a transaction associated with the consumer account; receive a one time password that is masked in response to determining that the device location does not match the transaction location; and reveal the one time password in response to receiving an input on the mobile device to authenticate the transaction.

Alternatively, or in addition to the above-described system, any one or combination of: the one time password is masked to conceal the one time password from the user of the mobile device. The transaction authentication manager is configured to initiate a display of the one time password on a display device of the mobile device in response to determining that the device location matches the transaction location. The transaction authentication manager is configured to initiate a display of the one time password that is masked and the transaction location of the transaction; and prompt the user to authenticate the transaction based on the transaction location and the device location of the mobile device. The transaction authentication manager is configured to initiate an authentication of the transaction associated with the consumer account of the user in response to receiving the input to authenticate the transaction. The one time password is received as at least one of an email message or a standard text message.

The invention claimed is:

1. A mobile device, comprising:

a location service to determine a device location of the mobile device; and a transaction authentication manager implemented at least partially in hardware and configured to:

receive a transaction location of a transaction associated with an account of a user of the mobile device;

compare the device location of the mobile device to the transaction location of the transaction;

generate an authentication message including a one time password for display, the authentication message configured to show the one time password in response to determining that the device location matches the transaction location and mask the one time password in response to determining that the device location does not match the transaction location; and responsive to the one time password being masked, one of:

reveal the one time password in the authentication message in response to receiving an input on the mobile device to authenticate the transaction; or restrict approval of the transaction by the mobile device, maintain the masked one time password in the authentication message, and communicate an indication that the transaction is fraudulent.

2. The mobile device of claim 1, wherein the transaction is initiated on a transaction device that is different than the mobile device, and the transaction location corresponds to the transaction initiated on the transaction device with the account of the user associated with the mobile device.

3. The mobile device of claim 1, wherein the transaction authentication manager is configured to:

initiate a display of the one time password that is masked and the transaction location of the transaction; and prompt the user to authenticate the transaction based on the transaction location and the device location of the mobile device.

4. The mobile device of claim 1, wherein the transaction authentication manager is configured to initiate an authentication of the transaction associated with the account of the user in response to receiving the input to authenticate the transaction.

5. The mobile device of claim 1, wherein the authentication message includes an authentication prompt, and the input to authenticate the transaction includes user input to the authentication prompt.

6. The mobile device of claim 5, wherein the authentication message describes the transaction location.

7. The mobile device of claim 5, wherein the transaction authentication manager is configured to communicate an indication that the transaction is authentic based on receiving the user input to the authentication prompt of the authentication message.

8. The mobile device of claim 7, wherein the transaction authentication manager is configured to communicate the indication that the transaction is authentic further based on receiving user entry of the one time password to the authentication prompt of the authentication message.

9. The mobile device of claim 1, wherein the authentication message includes an authentication prompt that receives the input on the mobile device that reveals the one time password from the masked one time password in the authentication message, the authentication prompt is configured to receive another input including user entry of the one time password, and the transaction authentication manager is configured to communicate an indication that the transaction is authentic in response to receiving the input including user entry of the one time password at the authentication prompt.

10. The mobile device of claim 1, wherein the transaction authentication manager restricts approval of the transaction by the mobile device based on user input received at the authentication message to indicate that the transaction is fraudulent.

11. A method, comprising:

determining a user location of a user based on a device location of a mobile device that is associated with the user;

determining a transaction location of a transaction associated with an account of the user of the mobile device;

comparing the user location of the user and the transaction location of the transaction;

generating an authentication message including a one time password for display, the authentication message configured to show the one time password in response to determining that the user location matches the transaction location and mask the one time password in response to determining that the user location does not match the transaction location; and responsive to the one time password being masked, one of:

revealing the one time password in the authentication message in response to receiving an input to authenticate the transaction; or restricting approval of the transaction by the mobile device, maintaining the masked one time password in the authentication message, and communicating an indication that the transaction is fraudulent.

12. The method of claim 11, wherein the transaction is initiated on a transaction device that is different than the mobile device, and the transaction location corresponds to the transaction initiated on the transaction device with the account of the user associated with the mobile device.

13. The method of claim 11, further comprising:

displaying the one time password that is masked and the transaction location of the transaction; and prompting the user to authenticate the transaction based on the transaction location and the user location.

14. The method of claim 11, further comprising:

initiating an authentication of the transaction associated with the account of the user in response to receiving the input to authenticate the transaction.

15. The method of claim 11, wherein the input is received at an authentication prompt of the authentication message, and further comprising:

receiving another input at the authentication prompt including user entry of the one time password; and responsive to receiving the input at the authentication prompt including user entry of the one time password, communicating an indication that the transaction is authentic.

16. A system, comprising:

a mobile device that is associated with a consumer account of a user; and a transaction authentication manager implemented at least partially in hardware and configured to:

compare a device location of the mobile device with a transaction location of a transaction associated with the consumer account;

generate an authentication message including a one time password for display, the authentication message configured to show the one time password in response to determining that the device location matches the transaction location and mask the one time password in response to determining that the device location does not match the transaction location; and responsive to the one time password being masked, one of:

reveal the one time password in the authentication message in response to receiving an input on the mobile device to authenticate the transaction; or restrict approval of the transaction by the mobile device, maintain the masked one time password in the authentication message, and communicate an indication that the transaction is fraudulent.

17. The system of claim 16, wherein the transaction authentication manager is configured to:

initiate a display of the one time password that is masked and the transaction location of the transaction; and prompt the user to authenticate the transaction based on the transaction location and the device location of the mobile device.

18. The system of claim 16, wherein the transaction authentication manager is configured to initiate an authentication of the transaction associated with the consumer account of the user in response to receiving the input to authenticate the transaction.

19. The system of claim 16, wherein the authentication message describes the transaction location and includes an authentication prompt, and the input to authenticate the transaction includes user input to the authentication prompt.

20. The system of claim 16, wherein the authentication message includes an authentication prompt that receives the input on the mobile device that reveals the one time password from the masked one time password in the authentication message, the authentication prompt is configured to receive another input including user entry of the one time password, and the transaction authentication manager is configured to communicate an indication that the transaction is authentic in response to receiving the input including user entry of the one time password at the authentication prompt.

* * * * *